Jan. 17, 1950  A. L. HIGHBERG ET AL  2,494,658
BLADE MOUNTING
Filed May 10, 1946

INVENTORS
AXEL L. HIGHBERG
PHILIP P. NEWCOMB
CARL R. SODERBERG

Charles A Warren
ATTORNEY

Patented Jan. 17, 1950

2,494,658

UNITED STATES PATENT OFFICE 2,494,658

BLADE MOUNTING

Axel L. Highberg, West Hartford, and Philip P. Newcomb, Manchester, Conn., and Carl R. Soderberg, Weston, Mass., assignors to United Aircraft Corporation, East Hartford, Conn., a corporation of Delaware Application May 10, 1946, Serial No. 668,792

8 Claims. (Cl. 253—39)

The present invention relates to a blade mounting for compressor or turbine blades.

The blades for either compressor or turbines are generally attached to the turbine disc by formed blade roots which fit within a cooperating groove in the disc. This groove may be either peripheral for circumferential assembly of the blades, or in a direction parallel to the axis of the disc, in which case a separate groove is provided for each of the formed roots. One difficulty of the peripheral groove is the tendency for the disc to spread under the centrifugal load applied by rotation of the disc, which, if not prevented, would ultimately release the blades. A feature of this invention is an arrangement by which to prevent spreading of the disc at its periphery to hold the blades more securely in place.

When the blades are located in a circumferential groove, the blades are generally inserted at one place in the periphery and are then moved circumferentially around the periphery of the disc into the desired position. To minimize this assembly problem, the disc has been made up of two parts so that the opposed halves of the disc may be assembled on a row of blades. With this arrangement, the tendency for spreading of the discs at the periphery, thereby loosening or releasing the blades, is even greater. A feature of the invention is an arrangement for preventing spreading of the opposed discs after the blades have been clamped in position.

In the assembly of turbine or compressor discs each blade root may be held by a pin extending through the disc and the root. Once the hub has been drilled for one set of roots it is not adapted for supporting blades having thinner or thicker roots, as where it may be desirable to replace one set of blades by another set using a different number of blades. A feature of the invention is an arrangement by which the hub is adapted to support the blades regardless of the thickness of the root.

Another feature is the use of plates located on opposite sides of the hub and positioned to engage with inwardly projecting flanges on the blade roots, thereby to prevent any spreading of the hub adjacent to the blade fastening.

Another feature of the invention is the decrease in axial dimension made possible by using a supporting plate to take the bending loads. If the hub itself is made heavy enough to carry the loads the periphery of the hub would, of necessity, be much thicker and would require greater spacing between successive stages of a multistage unit.

Other objects and advantages will be apparent from the specification and claims, and from the accompanying drawings which illustrate an embodiment of the invention.

Figures 1, 2:
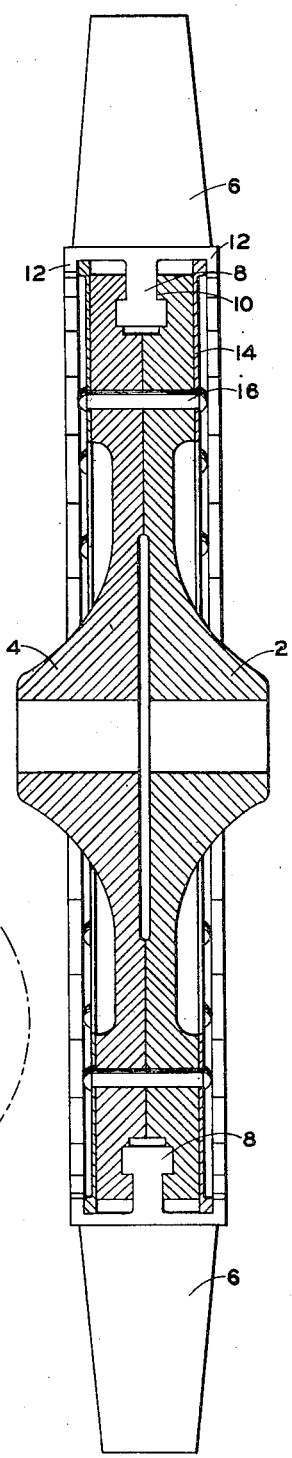
Fig. 1 is a sectional view through the rotor disc.
Fig. 2 is a side elevation, on a smaller scale, of the disc.

The completed rotor is made up of opposed hub elements 2 and 4, which together form a hub for the support of a row of blades 6. Each blade has a T-shaped root 8, fitting within a correspondingly shaped groove 10, formed in the periphery of the hub. As shown, the groove 10 is formed partly in each of the hub elements, so that when the elements are assembled, the groove 10 is of the proper shape to receive the blade roots.

Each of the blade roots has inwardly extending flanges 12, which are spaced apart a distance greater than the thickness of the hub at its periphery and which are in a position to engage with plates 14, preferably segmental, which are positioned on opposite sides of the hub and extend beyond the periphery of the hub to engage with the inner radial surfaces on the flanges 12. The plates 14 at their outer edges are thick enough to fill the axial space between the outer side surface of the hub and the adjacent flange 12 on the blade root and in this way will prevent any spreading of the hub elements adjacent the periphery where they would be most highly stressed during rotation of the disc.

It will be noted that the diameter of the hub elements 2 and 4 is slightly less than the inside diameter of the cylinder defined by the innermost surfaces of the flanges 12 when the row of blades 6 is assembled ready to be fastened to the hub. In this way the hub elements 2 and 4 may be placed in position on the blade roots by axial assembly of the hub elements. After the hub elements and the plates 14 are in position, they may be fastened together as by rivets 16 extending through the hub elements and the plates.

It is to be understood that the invention is not limited to the specific embodiment herein illustrated and described, but may be used in other ways without departure from its spirit as defined by the following claims.

We claim:

1. A blade mounting including a hub having opposed hub elements defining between them a peripheral substantially T-shaped groove, a blade having a T-shaped root fitting in said groove, and having spaced flanges extending inwardly, said flanges being spaced apart a distance greater than the thickness of the hub adjacent the flanges, and plates fastened to opposite sides of the hub adjacent its periphery and extending beyond the periphery of the hub to engage laterally with the inner side surfaces of the flanges.

2. A blade mounting including a hub having opposed hub elements defining between them a peripheral substantially T-shaped groove, a blade having a T-shaped root fitting in said groove, and having spaced flanges extending inwardly, said flanges being spaced apart a distance greater than the thickness of the hub adjacent the flanges, and plates fastened to opposite sides of the hub adjacent its periphery and extending beyond the periphery of the hub to engage laterally between the flanges and the hub.

3. A blade mounting including a hub having opposed hub elements defining between them a peripheral groove, a blade having a root fitting in said groove and having spaced flanges extending inwardly toward the axis of the hub, said flanges being more widely spaced than the thickness of the hub adjacent to the flanges, and plates fastened to opposite sides of the hub adjacent its periphery and extending laterally between the hub and the flanges to prevent spreading of the hub elements.

4. A blade mounting including a hub having opposed hub elements defining between them a peripheral groove, a blade having a root fitting in said groove and having spaced flanges extending inwardly toward the axis of the hub, said flanges being more widely spaced than the thickness of the hub adjacent to the flanges, and plates fastened to opposite sides of the hub adjacent its periphery and extending laterally between the hub and the flanges to prevent spreading of the hub elements, said plates being thick enough to fill the space between the side of the hub and the inner side surfaces of the adjacent flange.

5. A blade mounting including a hub having opposed hub elements defining between them a peripheral groove, a blade having a root fitting in said groove and having flanges spaced from the root and extending inwardly toward the axis of the hub, the outside diameter of the hub elements being smaller than the inner periphery of the flanges on the blade to permit assembly of the hub elements with a row of blades in place, and a plate fastened to the outer side of each of said hub elements and extending beyond the periphery of the hub to engage laterally with the inner side surface of the flange and hold the hub element in place.

6. A blade mounting including a hub having opposed hub elements defining between them a peripheral groove, a blade having a T-shaped root fitting in said groove and having spaced peripheral flanges spaced apart a distance greater than the thickness of the hub adjacent thereto and extending inwardly toward the axis of the hub, the outside diameter of the hub elements being smaller than the inner periphery of the flanges on the blade to permit axail assembly of the hub elements with a row of blades, the groove in the hub fitting the T-shaped root, and a plate fastened to each side of the hub and extending beyond the periphery of the hub to engage laterally with the inner side surfaces of the inwardly extending flanges to hold the blade in position on the hub.

7. A blade mounting including a hub having a peripheral groove wider at the base than at the outer periphery of the hub, a blade having a root engaging with said groove and also having spaced inwardly extending flanges the spacing of which is greater than the thickness of the hub adjacent thereto, the inner surface of each flange being at a greater distance from the center of the hub than the radius of the hub and plates on opposite sides of the hub with the outer edges of the plates positioned between the hub and the inner side surfaces of the flanges to prevent spreading of the hub at opposite sides of the groove.

8. A blade mounting including a hub having a peripheral groove wider at the base than at the outer periphery of the hub, a blade having a root filling said groove and being otherwise spaced from said hub, said blade having spaced inwardly extending flanges the spacing of which is greater than the thickness of the hub adjacent thereto, the inner surface of each flange being at a greater distance from the center of the hub than the radius of the hub and plates on opposite sides of the hub and positioned between the hub and the inner side surfaces of the flanges, said plates extending beyond the periphery of the hub.

AXEL L. HIGHBERG.
PHILIP P. NEWCOMB.
CARL R. SODERBERG.

REFERENCES CITED

The following references are of record in the file of this patent:

UNITED STATES PATENTS

| Number | Name | Date |
| --- | --- | --- |
| 648,158 | Zoelly | Apr. 24, 1900 |
| 876,971 | Junggren | Jan. 21, 1908 |
| 1,614,145 | Moss | Jan. 11, 1927 |
| 2,398,140 | Heppner | Apr. 9, 1946 |